March 25, 1941. D. R. KING 2,235,836
DEVICE FOR ARRESTING THE MOTION OF VEHICLES
Filed Oct. 9, 1940
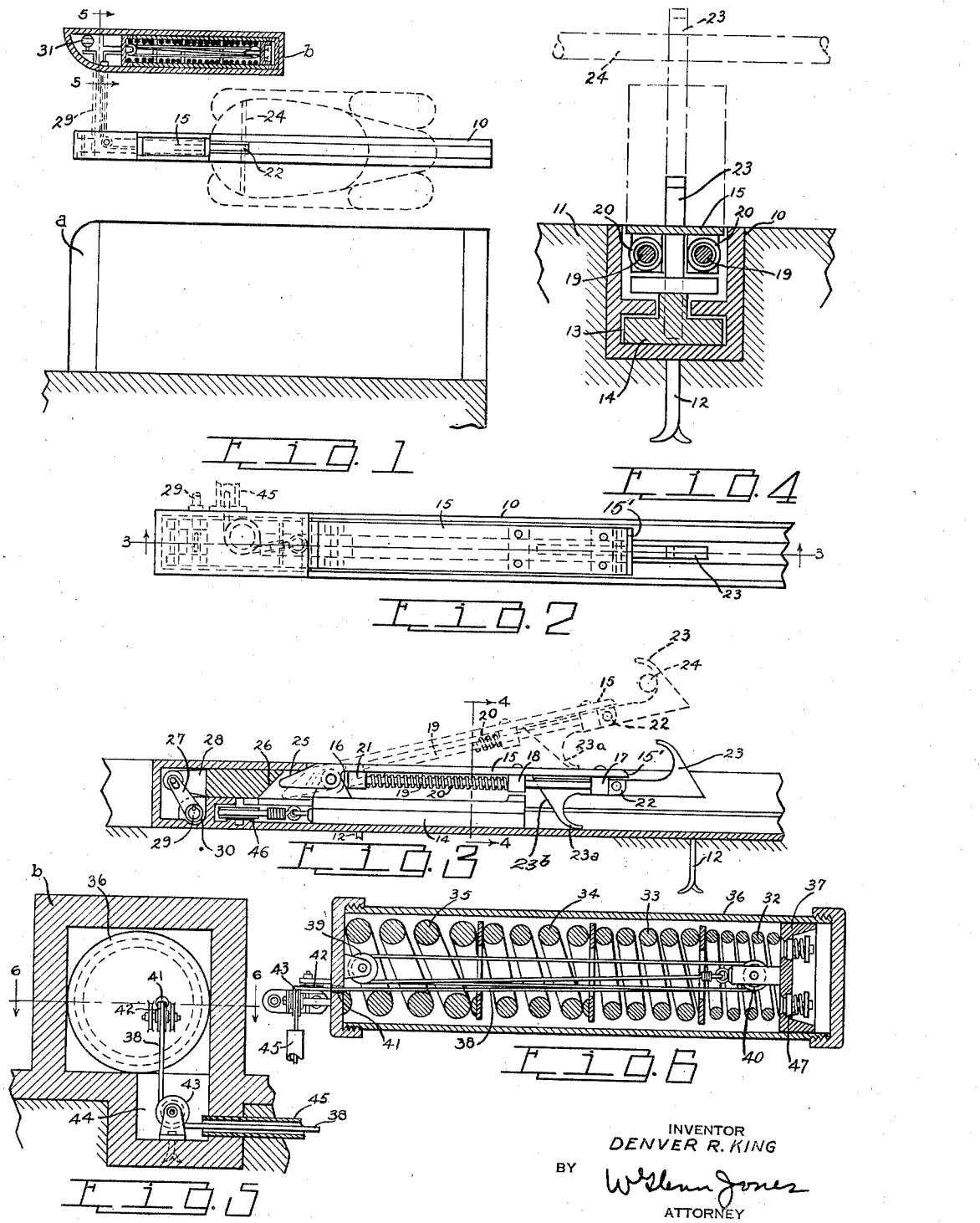
INVENTOR
DENVER R. KING
BY W. Glenn Jones
ATTORNEY Patented Mar. 25, 1941

2,235,836

UNITED STATES PATENT OFFICE 2,235,836

DEVICE FOR ARRESTING THE MOTION OF VEHICLES

Denver R. King, United States Navy

Application October 9, 1940, Serial No. 360,420

10 Claims. (Cl. 188—32)

(Granted under the act of March 3, 1883, as amended April 30, 1928; 370 O. G. 757)

This invention relates to devices for arresting the motion of vehicles and it has a particular relation to devices such as that disclosed in U. S. Letters Patent No. 2,151,704, granted to me on March 28, 1939.

One of the objects of the present invention is the provision of a device of the character described which embodies a hook mounted in a thoroughfare adjacent to an intersection for engagement with a cable or other suitable device carried by a vehicle to interrupt its progress, the device being preferably operated in conjunction with a signal.

Another object of the invention is the provision of means for insuring a gradual return of the parts to their initial position after having been engaged by a vehicle and released therefrom.

A further object of this invention is the provision of a device of the character described, which is simple and rugged in construction and which may be manufactured at less expense than those heretofore employed.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing, means for carrying the invention into practical use, without limiting the improvements in their useful application to the particular construction, which, for the purpose of explanation, have been made the subject of illustration.

In the accompanying drawing:

Fig. 1 is a diagrammatic plan view of a vehicle arresting installation adjacent to an intersection;

Fig. 2 is an enlarged plan view of the arresting hook mechanism shown in Fig. 1;

Fig. 3 is a longitudinal sectional view taken on line 3—3 of Fig. 2;

Fig. 4 is a vertical transverse sectional view on a larger scale taken on line 4—4 of Fig. 3;

Fig. 5 is a vertical transverse sectional view on a larger scale taken on line 5—5 of Fig. 1; and Fig. 6 is an enlarged longitudinal sectional view taken on line 6—6 of Fig. 5.

Referring to the drawing, a vehicle arresting device constructed in accordance with the invention, is shown as comprising a housing 10 embedded in the paving 11 of a thoroughfare with its upper surface lying flush therewith and locked thereto by anchor members 12. The device is herein shown as being located in the thoroughfare between a loading platform a and an island b where it is compulsory for a vehicle to pass thereover under normal traffic conditions. The housing 10 is formed with a track 13 in which a carriage 14 is mounted for longitudinal sliding movement. A lever in the form of a flat plate 15 having a forward beveled edge 15' is pivotally mounted at its rear end on an ear 16 formed on the carriage for vertical swinging movement and is provided on its under side with front and rear pairs of spaced lugs 17 and 18, respectively, in which two parallel rods 19 are slidably mounted. These rods are urged in a rearward direction by coil springs 20 which encircle the rods 19 between the rear lugs 18 and collars 21 fixed to the rear ends of the rods. Blocks 22 are fixed to the forward ends of the rods 19 and form the bearings for a pair of opposed hooks 23 and 23a which are pivotally mounted therebetween for vertical swinging movement. The forward of these hooks extends upwardly into a position to engage a cable 24 yieldably mounted on the frame of a vehicle, while the rear hook extends downwardly in an inoperative position beneath the plate 15 and forms a part of a latch mechanism presently to be described.

The rear end of the plate 15 is formed with a cam surface 25 for engagement by a cam block 26 which is slidably mounted on the rear end of the carriage 14 and which is reciprocated by a lever arm 27 having a slot and pin pivotal connection between ears 28 formed on the cam block 26. The lever arm 27 is fixed to one end of a rock shaft 29 which extends through a pipe 30 located beneath the surface of the street and extending to the island b. The other end of the shaft 29 is connected in any suitable manner with an electric motor 31, Fig. 1, which operates in conjunction with a traffic signal, not shown, so that when the signal indicates "Go" the plate 15 and hooks 23 and 23a will lie flush with the surface of the street in an inoperative position. When, however, the signal changes to indicate "Stop," the motor 31 will be energized for a time interval of sufficient duration to rock the shaft 29 in a clockwise direction, as viewed in Fig. 3; and move the cam block 26 forwardly into engagement with the cam surface 25 of the plate 15. This will swing the plate 15 upwardly and place the forward hook 23 on a level with the cable 24 on the vehicle to be engaged thereby. The forward movement of the vehicle will first draw the hook 23 forwardly against the action of the springs 20 until the end of the rear hook 23a snaps over the beveled edge 15' of the plate 15 when the cam surface 23b of the hook 23a engages or is in position to engage the beveled edge 15' in a manner presently to be described. The continued forward travel of the vehicle then draws the carriage 14 forwardly along the track 13 which movement is retarded by a series of springs 32, 33, 34 and 35, of progressively increasing strength which are disposed within a cylinder 36, embedded in the island b, between one end of the cylinder and a buffer plate 37.

A cable 38 is connected at one end to the plate 37 and passes around pulleys 39 and 40 mounted on an end wall of the housing and the buffer plate respectively, thence through an opening 41 in the end wall and around pulleys 42 and 43 mounted on the end wall and in a well 44 formed in the island, thence through a pipe 45 extending beneath the street and thence around a pulley 46 journalled in the housing 10, and is secured at its other end to the carriage 14. When tension is relieved, due to the stoppage and possible backing of the vehicle, the springs 20 force the rods 19 rearwardly and the cam action of the surface 23b of the hook 23a against the beveled edge 15' swings the hooks around their pivotal support in a clockwise direction, thereby disengaging the hook 23 from the cable 24 and carrying both of the hooks 23 and 23a rearwardly back to a position in which the hooks are reversed, with the hook 23 lying beneath the plate 15 in the position previously occupied by the hook 23a, and with the hook 23a extending upwardly for engagement with the cable on a succeeding vehicle. The plate and hook construction above described thus provides a latch mechanism for automatically maintaining a hook in a cable engaging position and for resetting the device for a subsequent operation.

The backward or return movement of the carriage 14 and parts carried thereby is retarded so as to avoid any shock or jar when the progress of the vehicle is interrupted and the hook 23 is disengaged from the cable 24, by means of the buffer plate 37 which functions as a piston in the cylinder 36 and which is provided with a plurality of one-way valves 47 for permitting air trapped in the end of the cylinder to leak slowly through the buffer plate on its return movement.

The platform a on the right-hand side of each street at the corner is raised as high as the curb of the street or sidewalk, so as to form an entrance to the intersection through which the vehicle must pass. This space may be reserved for buses, cars and taxicabs discharging passengers. Cars and buses can run up on this space at a speed of six or eight miles per hour without damage, but should a car making twenty-five or thirty miles an hour attempt to run over the raised space to avoid passing over the arresting device when the light is red, the car would probably be damaged.

From the foregoing it will be apparent that a very compact and efficient vehicle arresting mechanism is provided, which embodies relatively few parts and in which it is only necessary to equip the vehicle with a simple hook engaging means such as the yieldably mounted cable herein illustrated.

It will be understood that the above description and accompanying drawing comprehend only the general and preferred embodiment of the invention, and that various changes in construction, proportion and arrangement of the parts may be made within the scope of the appended claims without sacrificing any of the advantages of the invention.

The invention described herein may be manufactured and/or used by or for the Government of the United States of America for governmental purposes without the payment of any royalties thereon or therefor.

I claim:

1. A device for arresting the motion of a vehicle comprising a hook mounted in the path of travel of the vehicle for engagement with a cable carried by the vehicle, means operable in conjunction with a traffic signal for swinging said hook between operative and inoperative positions and latch mechanism operable when the force exerted on said hook by said cable decreases through stoppage of the vehicle for disengaging said hook from said cable.

2. A device for arresting the motion of a vehicle comprising two hooks mounted in the path of travel of the vehicle for engagement with a cable carried by the vehicle, means operable in conjunction with a traffic signal for raising and lowering said hooks into and out of the path of travel of said cable, means for releasably holding one of said hooks in position to engage said cable and the other of said hooks in an inoperative position, and means operable when the force exerted on the hook engaging the cable decreases through the stoppage of the vehicle for disengaging said first mentioned hook from said cable and moving said second mentioned hook to a cable engaging position.

3. A device for arresting the motion of a vehicle comprising, a lever mounted in the path of travel of the vehicle for swinging movement about a horizontal axis, a hook mounted on said lever for engagement with a cable carried by the vehicle, means for swinging said lever about said axis to move said hook into and out of the path of travel of said cable, and latch mechanism operable when the force exerted on said hook by said cable decreases through the stoppage of the vehicle for disengaging said hook from said cable.

4. A device for arresting the motion of a vehicle comprising, a carriage mounted for movement in the path of and direction of travel of the vehicle, yieldable shock absorbing means for holding said carriage in a retracted position, a lever mounted on said carriage for swinging movement about a horizontal axis, a hook mounted on said lever for engagement with a cable carried by the vehicle, means for swinging said lever about said axis to move said hook into and out of the path of travel of said cable, and latch mechanism operable when the force exerted on said hook by said cable decreases through the stoppage of the vehicle for disengaging said hook from said cable.

5. A vehicle for arresting the motion of a vehicle comprising, a carriage mounted for movement in the path of and direction of travel of the vehicle, yieldable shock absorbing means for holding said carriage in a retracted position, a lever mounted on said carriage for swinging movement about a horizontal axis, a hook mounted on said lever for engagement with a cable carried by the vehicle, a cam for swinging said lever about said axis to move said hook into and out of the path of travel of said cable, and latch mechanism operable when the force exerted on said hook by said cable decreases through the stoppage of the vehicle for disengaging said hook from said cable.

6. A vehicle for arresting the motion of a vehicle comprising, a carriage mounted for movement in the path of and direction of travel of the vehicle, yieldable shock absorbing means for holding said carriage in a retracted position, a lever mounted on said carriage for swinging movement about a horizontal axis, a hook mounted on said lever for engagement with a cable carried by the vehicle, a cam for swinging said lever about said axis to move said hook into and out of the path of travel of said cable, latch mechanism operable when the force exerted on said hook by said cable decreases through the stoppage of the vehicle for disengaging said hook from said cable, and means operable in conjunction with a traffic signal for operating said cam.

7. A device for arresting the motion of a vehicle comprising, a carriage disposed in the path of travel of the vehicle and mounted for sliding movement in the direction of travel thereof, yielding shock absorbing means for urging said carriage toward a retracted position, a lever mounted on said carriage for swinging movement about a horizontal axis, a slide mounted on said lever, means for yieldably holding said slide in a retracted position, a hook pivotally mounted on said slide for engagement with a cable carried by the vehicle, a cam block slidably mounted on said carriage for swinging said lever about said axis to move said hook into and out of the path of travel of said cable, and latch mechanism operable when the force exerted on said hook by said cable moves said slide a predetermined distance on said lever for releasing said hook to permit it to become disengaged from said cable when the force exerted thereon decreases through the stoppage of the vehicle.

8. A device for arresting the motion of a vehicle comprising, a carriage disposed in the path of travel of the vehicle and mounted for sliding movement in the direction of travel thereof, yielding shock absorbing means for urging said carriage toward a retracted position, a lever mounted on said carriage for swinging movement about a horizontal axis, a slide mounted on said lever, means for yieldably holding said slide in a retracted position, a hook pivotally mounted on said slide for engagement with a cable carried by the vehicle, a cam block slidably mounted on said carriage for swinging said lever about said axis to move said hook into and out of the path of travel of said cable, means operable in conjunction with a traffic signal for actuating said cam, and latch mechanism operable when the force exerted on said hook by said cable moves said slide a predetermined distance on said lever for releasing said hook to permit it to become disengaged from said cable when the force exerted thereon decreases through the stoppage of the vehicle.

9. A device for arresting the motion of a vehicle comprising, a carriage disposed in the path of travel of the vehicle and movable in the direction of travel thereof, yieldable shock absorbing means for urging said carriage toward a retracted position, a lever mounted on said carriage for swinging movement about a horizontal axis, a slide mounted on said lever, means for yieldably holding said slide in retracted position, a pair of opposed hooks pivotally mounted on said slide for engagement with a cable carried by the vehicle, a cam block slidably mounted on said carriage for swinging said lever about said axis to move said hooks into and out of the path of travel of said cable, and latch means for releasably holding one of said hooks in position to engage said cable and the other of said hooks in an inoperative position, said latch means being operable when the force exerted on said first mentioned hook by said cable moves said slide a predetermined distance on said lever to release said hook to permit it to become disengaged from said cable when the force exerted thereon decreases through the stoppage of the vehicle and to swing said second mentioned hook to cable engaging position.

10. A device for arresting the motion of a vehicle comprising, a carriage disposed in the path of travel of the vehicle and movable in the direction of travel thereof, yieldable shock absorbing means for urging said carriage toward a retracted position, a lever mounted on said carriage for swinging movement about a horizontal axis, a slide mounted on said lever, means for yieldably holding said slide in retracted position, a pair of opposed hooks pivotally mounted on said slide for engagement with a cable carried by the vehicle, a cam block slidably mounted on said carriage for swinging said lever about said axis to move said hooks into and out of the path of travel of said cable, latch means for releasably holding one of said hooks in position to engage said cable and the other of said hooks in an inoperative position, said latch means being operable when the force exerted on said first mentioned hook by said cable moves said slide a predetermined distance on said lever to release said hook to permit it to become disengaged from said cable when the force exerted thereon decreases through the stoppage of the vehicle and to swing said second mentioned hook to cable disengaging position, and means operable in conjunction with a traffic signal for actuating said cam block.

DENVER R. KING.